(12) United States Patent
Kaiser et al.

(10) Patent No.: US 9,868,320 B2
(45) Date of Patent: Jan. 16, 2018

(54) ROLLING-RIVETED WHEEL BEARING ARRANGEMENT WITH A STEPPED INNER RING

(71) Applicant: Schaeffler Technologies AG & Co. KG, Herzogenaurach (DE)

(72) Inventors: Andreas Kaiser, Werneck (DE); Tobias Bauer, Gochsheim (DE); Frank Eichelmann, Donnersdorf (DE); Roland Langer, Schwanfeld (DE); Jonas Lang, Schwebheim (DE); Ralf Heiss, Nuremberg (DE); Markus Reuter, Wurzburg (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 15/119,197

(22) PCT Filed: Dec. 8, 2014

(86) PCT No.: PCT/DE2014/200686
§ 371 (c)(1),
(2) Date: Aug. 16, 2016

(87) PCT Pub. No.: WO2015/124125
PCT Pub. Date: Aug. 27, 2015

(65) Prior Publication Data
US 2017/0008339 A1 Jan. 12, 2017

(30) Foreign Application Priority Data
Feb. 18, 2014 (DE) .......................... 10 2014 202 948

(51) Int. Cl.
*F16C 33/58* (2006.01)
*B60B 27/00* (2006.01)
(Continued)

(52) U.S. Cl.
CPC ...... *B60B 27/0005* (2013.01); *B60B 27/0015* (2013.01); *B60B 27/0031* (2013.01);
(Continued)

(58) Field of Classification Search
CPC .................................................. B60B 27/0005
See application file for complete search history.

(56) References Cited

U.S. PATENT DOCUMENTS 4,893,960 A    1/1990  Beier et al.
6,203,441 B1 * 3/2001  Iarrera ................ B60B 27/0005
                                                    29/243.56
(Continued)

FOREIGN PATENT DOCUMENTS

DE          3636243     5/1988
DE       102005009935   9/2006
(Continued)

*Primary Examiner* — Thomas R Hannon
(74) *Attorney, Agent, or Firm* — Volpe and Koenig, P.C.

(57) ABSTRACT

A wheel bearing arrangement of a vehicle axle is disclosed. The wheel bearing arrangement includes a wheel bearing, which contains at least two rolling element rows, for supporting a wheel hub which can be driven by a drive element. The rolling elements of the wheel bearing are guided in races of a stationary outer ring, the rotating wheel hub, and a separate inner ring which is allocated to the wheel hub. In the assembled state, the wheel hub of the wheel bearing arrangement and the drive element are operatively connected via gearing. The inner ring has a radially stepped inner contour, the inner contour having two diameters which differ from one another, and are received in a complementarily designed receiving area of the wheel hub. The position of the inner ring is fixed on the end face by a rolling riveted collar of the wheel hub.

15 Claims, 3 Drawing Sheets

(51) Int. Cl.
*F16C 19/18* (2006.01)
*F16C 33/78* (2006.01)
*F16C 41/00* (2006.01)

(52) U.S. Cl.
CPC ...... *B60B 27/0068* (2013.01); *B60B 27/0073* (2013.01); *F16C 19/186* (2013.01); *F16C 33/586* (2013.01); *F16C 33/7886* (2013.01); *F16C 41/007* (2013.01); *B60B 27/0084* (2013.01); *B60B 2380/12* (2013.01); *B60B 2900/113* (2013.01); *B60B 2900/311* (2013.01); *B60B 2900/351* (2013.01); *F16C 2226/52* (2013.01); *F16C 2326/02* (2013.01)

(56) References Cited

U.S. PATENT DOCUMENTS

| | | | |
|---|---|---|---|
| 6,485,187 B1* | 11/2002 | Meeker | B60B 27/0084 384/537 |
| 7,350,976 B2* | 4/2008 | Ohtsuki | B60B 27/00 384/448 |
| 7,806,597 B2 | 10/2010 | Langer et al. | |
| 8,246,256 B2 | 8/2012 | Langer et al. | |
| 8,356,940 B2* | 1/2013 | Inoue | B60B 27/0005 384/448 |
| 9,259,964 B2 | 2/2016 | Mock et al. | |
| 2008/0031561 A1* | 2/2008 | Hakata | B60B 3/16 384/544 |
| 2009/0154856 A1 | 6/2009 | Kubota et al. | |
| 2010/0296759 A1 | 11/2010 | Dlugai et al. | |
| 2011/0044571 A1* | 2/2011 | Caldana | B60B 27/00 384/544 |
| 2012/0076450 A1 | 3/2012 | Suma | |

FOREIGN PATENT DOCUMENTS

| | | |
|---|---|---|
| DE | 102005019731 | 11/2006 |
| DE | 102007050256 | 4/2009 |
| EP | 0849477 | 6/1998 |
| JP | 2006112516 | 4/2006 |
| WO | 2013135448 | 9/2013 |

* cited by examiner

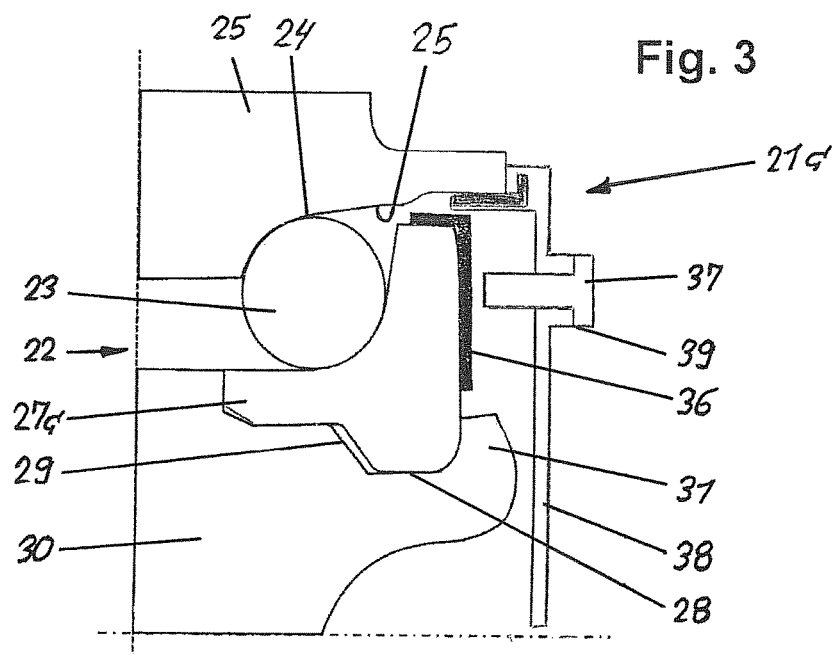
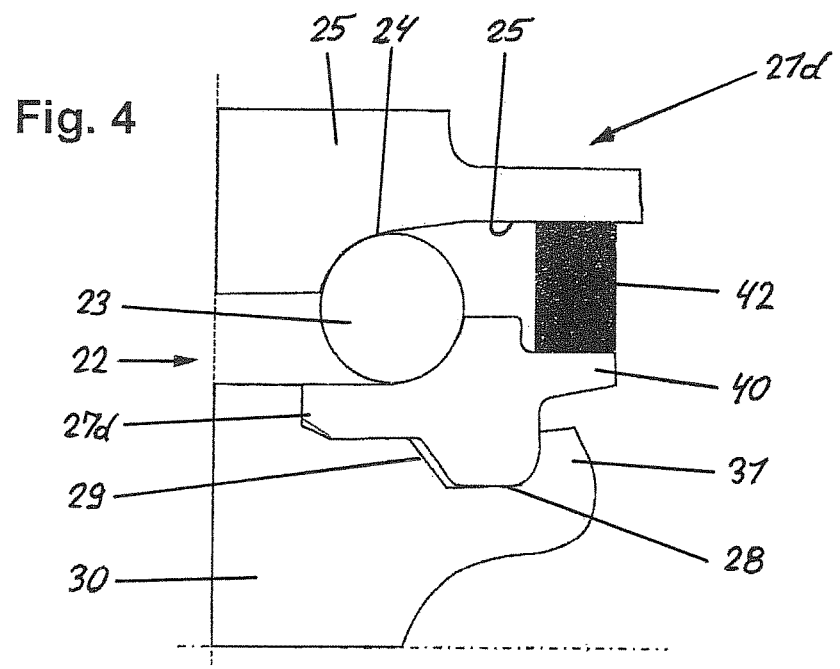

(Priot Art)

ROLLING-RIVETED WHEEL BEARING ARRANGEMENT WITH A STEPPED INNER RING

BACKGROUND

The invention relates to a wheel bearing arrangement of a vehicle axle with a wheel bearing that contains at least two rolling element rows for supporting a wheel hub that can be driven by a drive element or a wheel hub that is not driven.

Wheel bearing arrangements for vehicle wheels comprise a rotating wheel hub that connects the wheel bearing to the vehicle wheel and the brake disk, as well as, in the case of driven wheels, also to a drive element constructed, for example, as an articulated socket. Via the outer ring that is fixed in position, the wheel bearing is further connected to a wheel carrier of the chassis. A fixing of the wheel bearing on the wheel hub is realized, in particular, by an end-side rolling-riveted collar of the wheel hub receptacle.

The wheel hub and its attachment to the wheel carrier are exposed directly to loads introduced via the vehicle wheel during driving operation. Therefore, it is necessary that the wheel hub and its wheel bearing are designed reliably and produced with high quality.

The rolling-riveted collar for permanent fixing of the wheel bearing inner ring allows wheel bearing arrangements to be provided that are already pretensioned in the manufacturer's plant and can be mounted directly on the wheel carrier at the vehicle customer's facilities. This prevents incorrect assembly of the wheel bearing in which, for example, the pretensioning is not adjusted correctly. Because the pretensioning of a wheel bearing is a decisive factor in its service life, the rolling bearing manufacturer can control and optimally adjust the pretensioning by the rolling-riveted collar or the riveting and consequently provide an extensive guarantee for the product.

From DE 10 2005 019 731 A1, a wheel bearing arrangement is known that is constructed as an angular contact ball bearing and is pretensioned with a rolling-riveted collar, wherein, on the end, an axial gearing is introduced into the rolling-riveted collar. From DE 36 36 243 A1, a wheel bearing arrangement is known in which the wheel hub and an articulated socket of the drive element form a positive-fit, meshing engagement with each other by means of a pair of corresponding spur gearings, in order to transmit a drive torque. As an alternative to spur gearing, solutions are known in which the wheel hub is connected to the drive element by means of radial or internal gearing. In FIG. 6, US 2012/0076450 A1 discloses a wheel bearing arrangement for non-driven wheels with a wheel bearing constructed as a two-row conical roller bearing. A separate inner ring is here fixed by means of a rolling-riveted collar of the wheel hub.

FIG. 5 shows the setup of a wheel bearing arrangement 1 that is known from DE 10 2005 009 935 A1 and encloses a wheel bearing with two rolling element rows 5, 6. The rolling elements are guided on the outside in a flange 2 that is connected integrally to a wheel carrier and performs the function of a bearing ring. On the inner side, the first rolling element row 5 is guided on the wheel hub 3 and the other rolling element row 6 is guided on an inner ring 4 that is fit in the wheel hub 3. A position of the inner ring 4 is secured by a rolling-riveted collar 9 of the wheel hub 3 that is supported on the end side 11 of the inner ring 4. In the installed state, the wheel bearing arrangement 1 is in active connection with a drive element (not shown). For this purpose, gearing that engages, for example, with a positive fit in gearing of an articulated socket of the drive element is formed on the end side in the rolling-riveted collar 9 of the wheel hub 3.

SUMMARY

The object of the invention is to create a design for a flexible, installation-space-optimized construction of a wheel bearing arrangement that is simple to produce and with which an improved component stiffness can be realized.

This object is achieved by a wheel bearing arrangement with one or more features of the invention. Preferred constructions of the invention are listed below and in the claims.

According to the invention, the inner ring of the wheel bearing arrangement has a radially stepped construction that has two inner diameters that deviate from each other. In the installed state, the inner ring is fit with a receptacle of the wheel hub with a design that is complementary to the inner contour of the inner ring and is fixed in position on the end side by a rolling-riveted collar of the wheel hub.

The construction of the inner ring according to the invention with a local, inner thick section causes an advantageous, significant stiffening of the inner ring that thus offers effective protection against disadvantageous expansion during rolling riveting.

Due to the shortened inner ring, the necessary installation space in the axial direction of the wheel hub is simultaneously reduced. Consequently, the design according to the invention allows a flexible, installation space-optimized construction of the wheel bearing arrangement itself for a specified rolling rivet diameter or gearing diameter of spur gearing of the wheel hub. Due to the radial stiffening of the inner ring in the area of the smallest hole diameter, material can be removed from the inner ring in the area of the outer diameter. The additional installation space created in this way can be used to optimize the surrounding construction, for example, the sealing of the wheel bearing.

The shortened inner ring according to the invention also advantageously improves the component stiffness of the wheel hub that simultaneously leads to an improved bearing stiffness of the wheel bearing. The bearing stiffness is the resistance that the wheel bearing applies against elastic deflections caused by loading. The loading during driving operation includes forces that act on the vehicle wheel and the associated wheel suspension. The lower the bearing stiffness, the more the loads lead to tilting of the wheel system acting disadvantageously on the driving behavior of the vehicle, especially while driving in a curve. The design according to the invention also allows the introduction of a desired clamping force in the joint formed by the inner ring and the rolling-riveted collar of the wheel hub. The narrow and/or tapering tip of the inner ring pointing in the direction of a wheel bearing inner zone further causes a desired improved spring capability of the inner ring. Advantageously, the compact inner ring according to the invention is simple to produce and can be combined by economical measured both with a driven and also with a non-driven or towed wheel hub.

According to one preferred construction of the invention, it is provided that the inner ring is inserted in the installed position with the smallest inner or hole diameter oriented toward the rolling-riveted collar. In this installed position, the inner ring can be secured by a rolling rivet whose rolling rivet head size and rolling rivet diameter are significantly reduced to a measure that is easy to produce in comparison with previous solutions. Due to the solid and thus stiffer inner ring in the direction of the rolling riveted collar, for the rolling riveting performed by a wobbling motion, a disadvantageous expansion of the inner ring is advantageously reduced. Furthermore, the invention offers the ability to vary or adapt to a desired measure the rolling rivet diameter or the diameter of the spur gearing by adaptation of the rolling riveted collar-side inner ring diameter.

It is further provided that the inner ring forms a radially stepped and axially extending projection that overlaps the rolling riveted collar and can be realized within the shortened installation space according to the invention and thus within the installation space that is increased for the surrounding construction. The axially extending projection or collar forming a cylindrical lateral surface can interact with a seal of the wheel bearing. Preferably, the projection is suitable for supporting an elastic sealing lip of a seal that is fixed in position in the outer ring of the wheel bearing. Alternatively, it is possible to seal the wheel bearing by a cartridge seal, wherein, for example, a centrifugal disk of the cartridge seal is positioned on the projection of the inner ring.

As an alternative to or in addition to an axially extending projection or collar, the inner ring constructed according to the invention can enclose a radially oriented wall that is guided up to an annular gap on an inner contour of the outer ring.

In another advantageous embodiment, the invention includes a disk-like cover element mounted on the outer ring for sealing the wheel bearing. The cover element running preferably tightly against the wheel bearing preferably extends on the inside up to the wheel hub and here simultaneously overlaps the rolling-riveted collar of the wheel hub designed for fixing the inner ring.

The cover element forming a carrier element and also designated as a lid can furthermore be used for holding a sensor that is fixed in position and is in active connection with an encoder. The encoder is preferably fixed in position on a wall of the rotating inner ring oriented vertically or radially. Alternatively, the sensor can be arranged separately from the cover element. An attachment on the wheel carrier is suitable for this, wherein the sensor is in active connection with the encoder at a distance to the cover element. The sensor and the encoder are parts of a device for measuring the rotational movements of the wheel bearing, which are used, for example, for wheel axles of commercial vehicles and passenger cars. The device detects or monitors, for example, the wheel speed, the angular velocity, or the path of the encoder on a moving part of the wheel bearing and consequently of the wheel by the stationary sensor. The data obtained in this way can be transmitted to higher-level vehicle safety and regulation systems, for example, anti-lock brake system (ABS) or electronic slip regulation (ESR).

The inner ring produced according to the invention by a cutting or shaping method can advantageously be combined with a wheel hub, which are connected by a positive fit with the drive element by spur gearing, radial outer gearing, or internal gearing.

BRIEF DESCRIPTION OF THE DRAWINGS

Other features of the invention are given from the following description of the drawings in which embodiments of the invention are shown. The illustrated embodiments show examples of solutions according to the invention that, however, represent no conclusive delineation of the invention. Shown herein are.

DETAILED DESCRIPTION OF THE PREFERRED EMBODIMENTS

Figure 5:
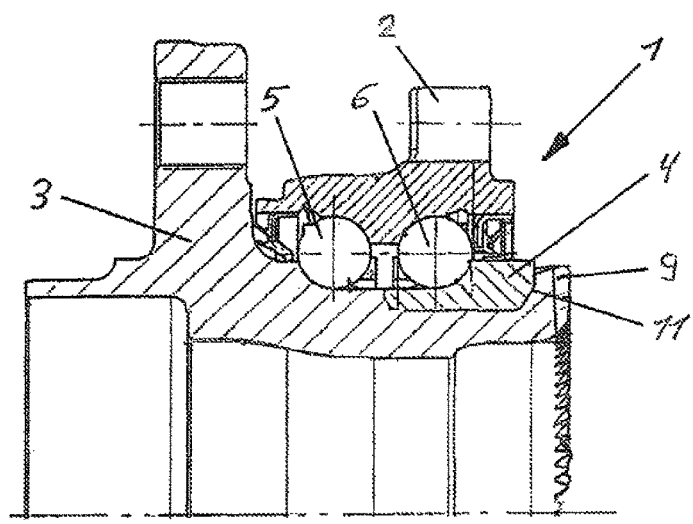

FIG. 1 to FIG. 4 show, relative to the known wheel bearing arrangement 1 described in the introduction according to FIG. 5, alternative embodiments of wheel bearing arrangements 21a to 21d of a vehicle axle with a wheel bearing that contains at least two rolling element rows in connection with an inner ring 27a to 27d constructed according to the invention.

Figure 1:
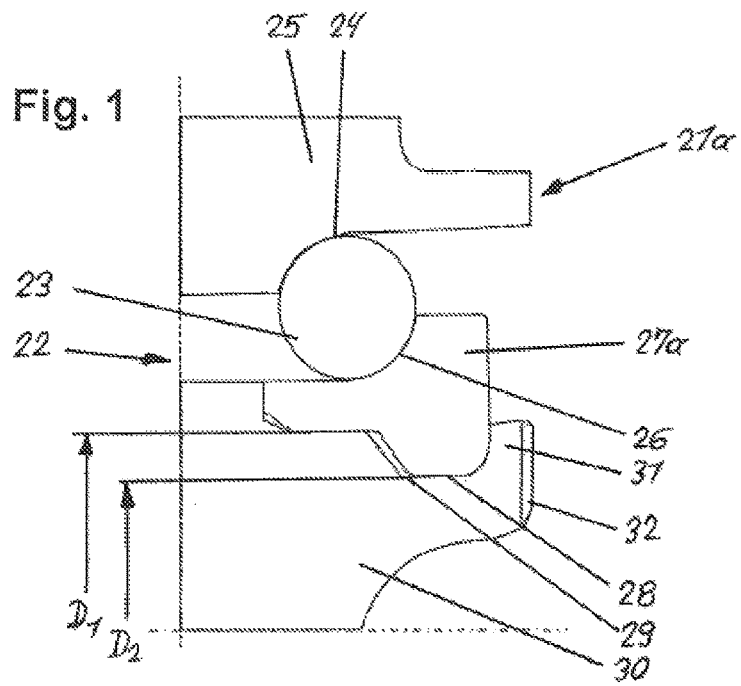
FIG. 1 a cutout of a wheel bearing arrangement, whose wheel bearing has an inner ring with two inner diameters that deviate from each other, FIG. 2 a wheel bearing arrangement with an inner ring that encloses, deviating from FIG. 1, a radially oriented, extended wall, FIG. 3 another wheel bearing arrangement that comprises an end-side cover element, FIG. 4 a wheel bearing arrangement in which a seal is inserted between the inner ring and the outer ring of the wheel bearing, and FIG. 5 a known prior art wheel bearing arrangement.

In FIG. 1, of a wheel bearing 22 of the wheel bearing arrangement 21a, only one of two axially spaced part rolling element rows is shown whose rolling elements 23 are guided on the outside in a raceway 24 of an outer ring 25 that is connected, preferably in a rotationally locked way, with a wheel carrier (not shown). On the inside, the rolling elements 23 are guided in a raceway 26 of an inner ring 27a that is constructed according to the invention. The inner ring 27a is adapted with a radially stepped inner contour 28 that has two inner diameters $D_1$, $D_2$ deviating from each other with a positive fit in a receptacle 29 of the wheel hub 30, wherein a position is secured by a rolling-riveted collar 31 of the wheel hub 30 supported on the inner ring 27a on the end side. In the installed state, the wheel bearing arrangement 21a is connected to a drive element (not shown) by spur gearing 32 with a positive fit. The inner ring 27a constructed according to the invention is installed with the smallest inner diameter $D_2$ oriented toward the rolling-riveted collar 31. The local thick section on the inside on the inner contour 28 causes a stiffening and a protection against an expansion of the inner ring 27a during the rolling riveting for forming the rolling-riveted collar 31. On the other side, a desired improved spring capability of the inner ring 27a is set by a thin-walled or narrow or tapering contour of the inner ring 27a on the side facing away from the rolling-riveted collar 31.

Figure 2:
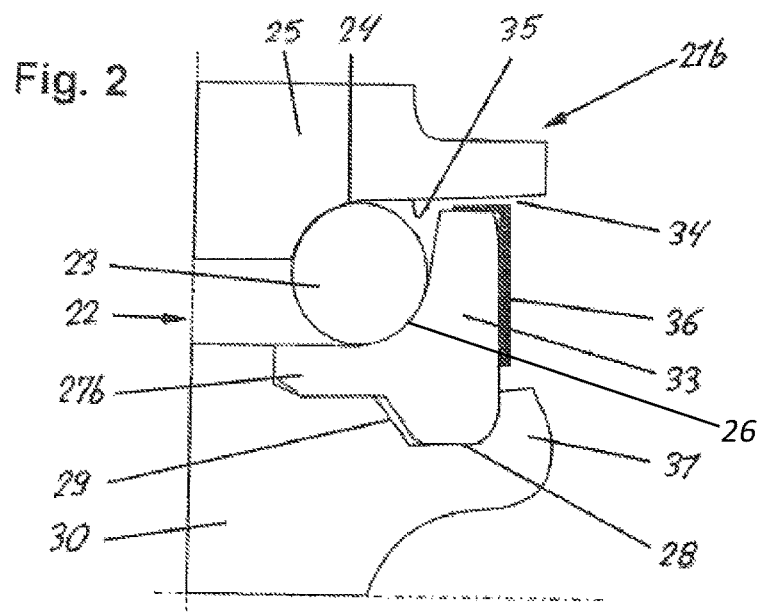

In FIG. 2 to FIG. 4, wheel bearing arrangements 21b to 21d are shown that are largely comparable with the wheel bearing arrangement 21a according to FIG. 2. Here, the reference characters for components or parts that are identical or functionally identical with those of FIG. 1 match. The following descriptions are therefore largely restricted to different constructions that are essential for the invention.

FIG. 2 shows the wheel bearing arrangement 21b, whose inner ring 27b forms a radially extending wall 33 that is guided up to an annular gap 34 on an inner wall 35 of the outer ring 25. As shown in FIG. 2, the radially extending wall 33 extends radially outwardly and radially overlaps with a radially outer raceway 24. A radially inner raceway 26 defines a curved surface for supporting the rolling elements 23 that extends continuously to the radially oriented wall 33 of the inner ring 27b, and the curved surface radially overlaps with the radially outer raceway 24. The wall 33 protects the wheel bearing 22, for example, from the ingress of coarse contaminating particles or can be used in connection with another seal (not shown) for forming a seal labyrinth. Furthermore, the wall 33 provides the ability to mount an encoder 36 that is, together with a sensor 37 shown in FIG. 3, part of a device that is designed for measuring the rotational movement of the wheel bearing 22.

The wheel bearing arrangement 21c according to FIG. 3 contains a cover element 38 that is mounted on the outer ring 25, in particular, with a material fit or by an interference fit, and extends on the inside up to the wheel hub 30 and here overlaps the rolling riveted collar 31. The cover element 38 that is preferably made from a metallic material, for example, stainless steel, is provided just for a non-driven wheel bearing or in a combination with a subsequent seal for a driven wheel bearing, in particular, for creating an effective sealing of the wheel bearing 22. In addition, the cover element 38 can be used as a carrier element in that this forms a receptacle 39 for the sensor 37 that is positioned axially at a close distance to the encoder 36 arranged on the inner ring 27c.

According to FIG. 4, the inner ring 27d of the wheel bearing arrangement 21d forms an axially extending projection 40 on the side pointing toward the rolling-riveted collar 31. The projection 40 enclosing the rolling-riveted collar 31 at a radial distance and also called a rim has, on the outside, a cylindrical lateral surface 41 on which, for example, an elastic sealing lip of a seal arranged on the inner wall 35 of the outer ring 25 is supported. As an alternative it is provided to insert a cartridge seal 42 in the area defined radially by the projection 40 and the inner wall 35, wherein, for example, a centrifugal disk of the cartridge seal 42 is fixed in position on the projections 40. A sealing element (not shown) connected to the drive element can also be fixed on the projection 40 as an alternative to or in addition to the cartridge seal 42. This additional seal designed, for example, as a sleeve seal, here connects the wheel hub 3 to an articulated socket of the drive element.

LIST OF REFERENCE NUMBERS

1 Wheel bearing arrangement
2 Flange
3 Wheel hub
4 Inner ring
5 Rolling element row
6 Rolling element row
9 Rolling-riveted collar
11 End side
21a to 21d Wheel bearing arrangement
22 Wheel bearing
23 Rolling element
24 Raceway
25 Outer ring
26 Raceway
27a to 27d Inner ring
28 Inner contour
29 Receptacle
30 Wheel hub
31 Rolling-riveted collar
32 Spur gearing
33 Wall
34 Annular gap
35 Inner wall
36 Encoder
37 Sensor
38 Cover element
39 Receptacle
40 Projection
41 Lateral surface
42 Cartridge seal

The invention claimed is:

1. A wheel bearing arrangement of a vehicle axle, comprising a wheel bearing that includes at least two rolling element rows having rolling elements for supporting a wheel hub that is driven by a drive element or a wheel hub that is not driven, the rolling elements of the wheel bearing are guided in a radially outer raceway of a stationary outer ring and a radially inner raceway of a separate inner ring allocated to the wheel hub, and the drive element is in an active connection with the wheel hub by gearing, the inner ring has a radially stepped inner contour that has two inner diameters ($D_1$, $D_2$) that deviate from each other and fit in a complementarily shaped receptacle of the wheel hub and is further fixed in position on an end side by a rolling riveted collar of the wheel hub, a radially oriented wall of the inner ring extends radially outwardly and radially overlaps with the radially outer raceway, and the inner ring is installed in an installed state with a smallest inner diameter ($D_2$) oriented toward the rolling-riveted collar.

2. The wheel bearing arrangement according to claim 1, wherein the radially oriented wall of the inner ring is guided up to an annular gap on an inner contour of the outer ring.

3. The wheel bearing arrangement according to claim 1, wherein the radially inner raceway defines a curved surface for supporting the rolling elements that extends continuously to the radially oriented wall of the inner ring, and the curved surface radially overlaps with the radially outer raceway.

4. The wheel bearing arrangement according to claim 1, wherein an encoder is directly attached to both a radially outer end surface and an axial end surface of the radially oriented wall.

5. A wheel bearing arrangement of a vehicle axle, comprising a wheel bearing that includes at least two rolling element rows having rolling elements for supporting a wheel hub that is driven by a drive element or a wheel hub that is not driven, the rolling elements of the wheel bearing are guided in a radially outer raceway of a stationary outer ring and a radially inner raceway of a separate inner ring allocated to the wheel hub, and the drive element is in an active connection with the wheel hub by gearing, the inner ring has a radially stepped inner contour that has two inner diameters ($D_1$, $D_2$) that deviate from each other and fit in a complementarily shaped receptacle of the wheel hub and is further fixed in position on an end side by a rolling riveted collar of the wheel hub, a radially oriented wall of the inner ring extends radially outwardly and radially overlaps with the radially outer raceway, further comprising a disk-shaped cover element that overlaps or covers the rolling-riveted collar of the wheel hub is mounted on the outer ring.

6. The wheel bearing arrangement according to claim 5, wherein the inner ring is installed in an installed state with a smallest inner diameter ($D_2$) oriented toward the rolling-riveted collar.

7. The wheel bearing arrangement according to claim 5, wherein the cover element has a receptacle for a sensor that interacts with an encoder that is arranged on the inner ring, which are parts of a device for measuring rotational movements of the wheel bearing.

8. The wheel bearing arrangement according to claim 5, wherein the radially oriented wall of the inner ring is guided up to an annular gap on an inner contour of the outer ring.

9. The wheel bearing arrangement according to claim 5, wherein the radially inner raceway defines a curved surface for supporting the rolling elements that extends continuously to the radially oriented wall of the inner ring, and the curved surface radially overlaps with the radially outer raceway.

10. The wheel bearing arrangement according to claim 5, wherein an encoder is directly attached to both a radially outer end surface and an axial end surface of the radially oriented wall.

11. A wheel bearing arrangement of a vehicle axle, comprising a wheel bearing that includes at least two rolling element rows having rolling elements for supporting a wheel hub that is driven by a drive element or a wheel hub that is not driven, the rolling elements of the wheel bearing are guided in a radially outer raceway of a stationary outer ring and a radially inner raceway of a separate inner ring allocated to the wheel hub, and the drive element is in an active connection with the wheel hub by gearing, the inner ring has a radially stepped inner contour that has two inner diameters ($D_1$, $D_2$) that deviate from each other and fit in a complementarily shaped receptacle of the wheel hub and is further fixed in position on an end side by a rolling riveted collar of the wheel hub, a radially oriented wall of the inner ring extends radially outwardly and radially overlaps with the radially outer raceway, wherein the wheel hub is connected to the drive element by positive-fit spur gearing or internal gearing formed on an axial end face of the wheel hub.

12. The wheel bearing arrangement according to claim 11, wherein the inner ring is installed in an installed state with a smallest inner diameter ($D_2$) oriented toward the rolling-riveted collar.

13. The wheel bearing arrangement according to claim 11, wherein the radially oriented wall of the inner ring is guided up to an annular gap on an inner contour of the outer ring.

14. The wheel bearing arrangement according to claim 11, wherein the radially inner raceway defines a curved surface for supporting the rolling elements that extends continuously to the radially oriented wall of the inner ring, and the curved surface radially overlaps with the radially outer raceway.

15. The wheel bearing arrangement according to claim 11, wherein an encoder is directly attached to both a radially outer end surface and an axial end surface of the radially oriented wall.

* * * * *